Dec. 14, 1948. H. D. MEINCKE, JR 2,456,524
APPARATUS SUITABLE FOR USE IN THE TREATMENT OF
WATER CONTAINING CHLORIDES DISSOLVED THEREIN
Filed May 12, 1944
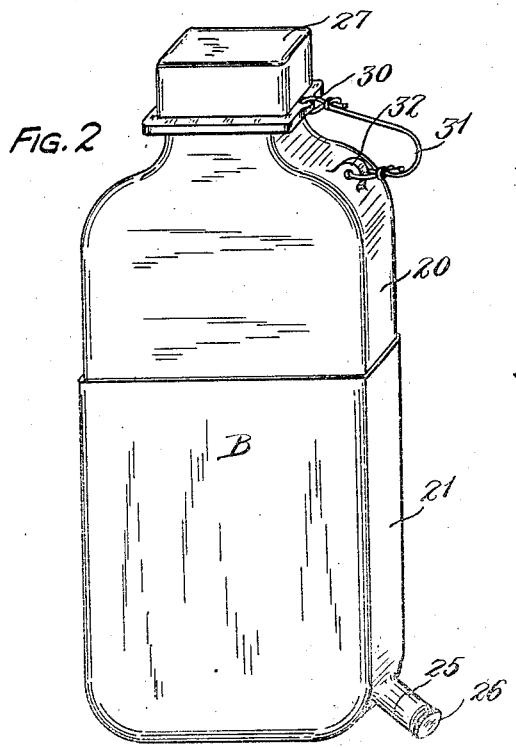
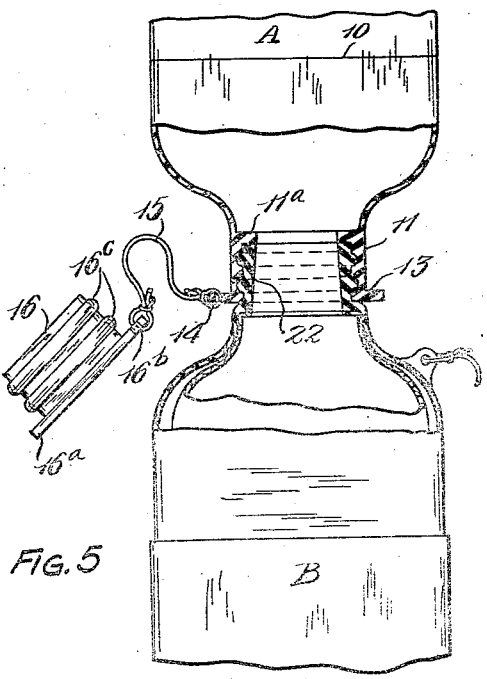
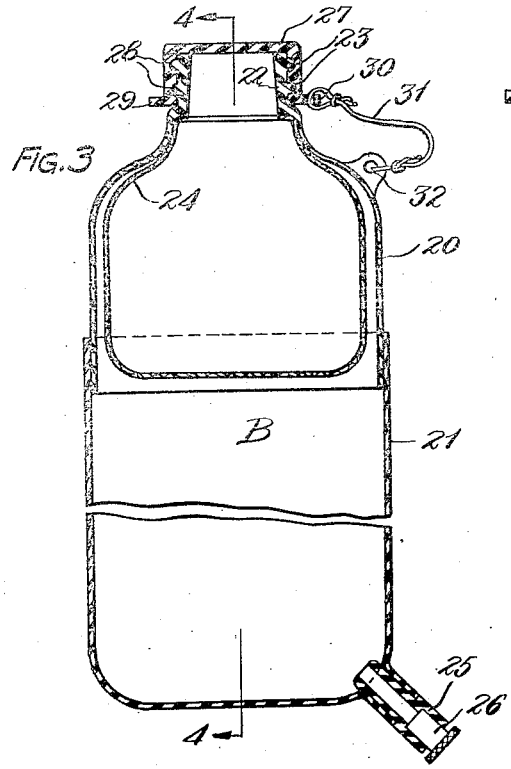
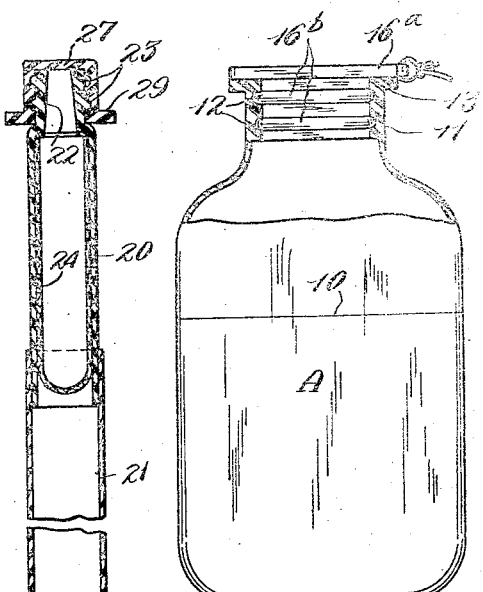
INVENTOR.
Howard D. Meincke, Jr.
BY
Hull & West
ATTORNEYS Patented Dec. 14, 1948

2,456,524

UNITED STATES PATENT OFFICE 2,456,524

APPARATUS SUITABLE FOR USE IN THE TREATMENT OF WATER CONTAINING CHLORIDES DISSOLVED THEREIN

Howard D. Meincke, Jr., Glencoe, Ill., assignor to Howard D. Meincke, Sr., Glencoe, Ill.

Application May 12, 1944, Serial No. 535,336

4 Claims. (Cl. 210—16)

This invention relates to apparatus suitable for use in the treatment of water (such as sea water) containing chlorides dissolved therein for the purpose of rendering such water drinkable.

While the apparatus is capable of more general application, it is particularly adapted for use by those who may have the misfortune to be adrift upon the open sea, with no available supply of fresh water; it is also particularly adaptable for use in carrying out the process of treating such water as set forth in my application filed March 25, 1944, which matured into Patent 2,374,116 on April 17, 1945.

It is the general purpose and object of my invention to provide an apparatus of the character referred to which constitutes a kit which shall be compact, whereby it will occupy only a small amount of space; which shall be simple in construction; and which can be readily utilized for the purpose for which it is designed.

My apparatus or kit consists in general of two containers in the form of collapsible bags of waterproof material, in one of which containers the water to be treated is subjected to the action of a suitable chemical reagent or reagents capable of precipitating one or more of the chlorine constituents of the chlorides dissolved in the water, and the other of which containers is provided with an efficient filter or strainer for removing the precipitate from the water delivered thereinto from the former container. The containers or bags are also provided with simple and effective means for conveniently connecting and disconnecting the same in order to allow the water which has been subjected to the reagent or reagents in one of said containers to be delivered into the other container through the filter contained in the latter.

Further objects of my invention will be set forth in connection with the description of the drawings forming part hereof, wherein Fig. 1 is a view in elevation, with parts broken away, of the mixing or reacting container comprised in my apparatus or kit; Fig. 2 a perspective view of the filtering container comprised in my apparatus or kit; Fig. 3 a longitudinal sectional view through the container shown in Fig. 2; Fig. 4 a detail in section corresponding to the line 4—4 of Fig. 3 and looking in the direction of the arrows; and Fig. 5 a view, partly in elevation and partly in section, showing the manner in which the two containers of my kit are utilized for the purpose of filtering liquid which has been treated in the container shown in Fig. 1, the cap employed with the lower of said containers being omitted.

Describing the various parts by reference characters, A denotes generally what I have termed the mixing or reacting container, the same being a bag made of collapsible waterproof material, such as molded rubber, and preferably being of a size adequate to yield, after treatment, 1 pint (473 c. c.) of drinkable water when filled with sea water to the line marked thereon and indicated at 10. The top of the container A is provided with a mouth at the outer end of a neck 11, made preferably of semi-hard rubber and having vertically spaced recesses 12 formed within and projecting outwardly from the inner wall thereof and extending entirely around said wall. At its top, the neck is provided with a flange 13, having a perforated lug or extension 14 projecting therefrom to which one end of a cord 15 is secured, the opposite end being secured to a perforated lug or extension 16$^b$ of the flange 16$^a$ on the capped stopper 16. This capped stopper is also made preferably of semi-hard rubber and is provided with spaced ribs 16$^c$, the stopper being of such size and shape as to form a snug fit within the neck 11 when pressed thereinto, the yielding nature of the material of which said neck is composed enabling the said ribs 16$^c$ to be sprung into the recesses provided within the said neck, whereby leakage between the neck and the stopper will be prevented.

For convenience of folding into a compact space, the bag A is shallow in depth from front to back, corresponding in this respect with the depth from front to back of the filtering bag, which will now be described.

The filtering bag, designated generally at B, comprises an upper section 20 and a lower section 21. The upper section is provided with a mouth at the outer end of a neck 22 made preferably of semi-hard rubber. The neck 22 is of such external dimensions and shape as to enable it and the neck 11 to be connected by firmly pressing the necks together, as shown in Fig. 5, it being noted that the neck 22 is provided on its external surface with vertically spaced outwardly extending ribs 23 which are adapted to be received within the recesses 12 of the neck of the container A, whereby a leakproof connection will be provided between the said containers when so united. The neck 11 is provided with an inwardly extending flange 11$^a$ at its base which is adapted to be engaged by the end of the neck 22 when the said necks are effectively connected.

Within the upper section 20 is located a filter 24 of suitable material, such as chamois skin, said filter having its upper end connected in any suitable manner to the bottom of the neck 22. The upper and lower sections of the filtering bag are telescopically united and their overlapping portions are secured together, as by vulcanization. The filtering container or bag thus formed is provided at its bottom with a tubular outlet spout 25 provided with a valve 26 and is also provided with a cap 27, also preferably made of semi-hard rubber and the internal dimensions of which are such as to enable it to form a tight closure with the neck 22 when pressed upon the latter. In order to prevent leakage between the container B and the cap, the latter is provided within its inner wall with vertically spaced recesses 28 into which the ribs 23 will be sprung when the cap is applied to the neck. The cap is also provided with a flange 29 at its base, the said flange having a perforated lug or extension 30 to which one end of a cord 31 is secured, the opposite end being secured to a perforated lug 32 formed on the upper section of the container or bag B.

When not in use, the containers or bags A and B will be collapsed and placed within a suitable receptacle which may also contain the chemical reagent or reagents with which the water is to be treated. The material employed for the production of the containers or bags permits the latter to be folded, if necessary, in order to enable them to be fitted within the said receptacle, and the oblong shape of their necks contributes to the compactness of the space which they will occupy.

When it is desirable or necessary to utilize my apparatus or kit, the cap 16 will be removed from the container or bag A and the latter filled with sea water to the line marked 10, the amount of sea water contained within the container or bag A being the amount required for cooperation with the chemical reagent or reagents which is or are inserted thereinto. Following this insertion, the cap will be reapplied and the container or bag shaken vigorously for a sufficient time to enable the reaction to occur. Utilizing the chemical reagent set forth in my aforesaid application, a period of agitation for approximately five minutes will be sufficient to accomplish the precipitation of the chlorine constituents of the sea water into an insoluble chloride. Following this, the cap 16 is removed and the containers or bags are connected by pressing the necks of the same together in the manner shown in Fig. 5, the material of which the necks are composed being sufficiently yieldable to enable the ribs formed on the neck 22 to be received within the recesses formed within the neck 11. The containers or bags are then held in a vertical position, as shown in Fig. 5, and the precipitated chlorine constituents of the sea water will be removed by means of the filter 24. After such removal, the water may be drunk from the container or bag B through the tube 25, by manipulating the valve 26 therein.

From the foregoing description, taken with the drawings, it will be seen that I have provided an apparatus or kit which is admirably adapted for the realization of the general purpose for which it has been designed and which is simple in construction, economical of production, and which has the important advantage of occupying a comparatively small space—a very important consideration for those who may have the misfortune to be adrift upon the open sea and crowded with others within a boat or upon a raft.

Having thus described my invention, what I claim is:

1. An apparatus suitable for the treatment of water containing a chloride in solution for the purpose of removing chlorine from said chloride dissolved therein, the said apparatus comprising a container of collapsible waterproof material having a neck of semi-rigid material, the neck having a mouth for the introduction thereinto and into said container of the water and a chemical suitable for precipitating chlorine from said chloride, dissolved therein, as an insoluble chloride, a second container of collapsible waterproof material having a neck of semi-rigid material provided with a mouth, a filter element of collapsible material within the second container and having its receiving portion secured in proximity to the inner end of the neck of the second container whereby water introduced into said second container must pass through said filter element, the necks of said containers being complementary in shape, one to the other, whereby the containers may be united through a movement of the neck of one of said containers longitudinally of the neck of the other container.

2. In the apparatus set forth in claim 1, one of the necks being provided on its outer surface with one or more outwardly extending ribs and the other of the necks being provided with one or more cooperating recesses therewithin projecting outwardly from the inner surface thereof and adapted to receive the said rib or ribs.

3. An apparatus suitable for the treatment of water containing a chloride in solution for the purpose of removing chlorine from said chloride dissolved therein, the said apparatus comprising a container molded from rubber in such manner that the width of the container greatly exceeds the depth of the same, said container having an oblong neck of semi-rigid material the width whereof greatly exceeds the depth thereof, a second container similar, as to material and shape, to the first container and also having a neck similar, as to material and shape, to the neck of the first container, a filter element of collapsible material in the second container having its open receiving end secured in proximity to the inner end of the neck of said second container whereby water introduced into said container must pass through said filter element, the necks of the said containers being complementary in shape, one to the other, whereby the containers may be united through a movement of the neck of one of said containers longitudinally of the neck of the other container.

4. In the apparatus set forth in claim 3, the neck of one of said containers being provided with spaced projections extending around the outer surface thereof and the neck of the other container being provided with spaced recesses extending around and projecting outwardly from the inner surface thereof and adapted to receive the said projections therewithin.

HOWARD D. MEINCKE, Jr.

REFERENCES CITED

The following references are of record in the file of this patent:

UNITED STATES PATENTS

| Number | Name | Date |
|---|---|---|
| 475,231 | Anderson | May 17, 1892 |
| 648,904 | Hart | May 1, 1900 |

(Other references on following page)

UNITED STATES PATENTS

| Number | Name | Date |
|---|---|---|
| 663,361 | Phelan | Dec. 4, 1900 |
| 782,736 | Epperson | Feb. 14, 1905 |
| 938,279 | Schultze | Oct. 26, 1909 |
| 1,052,391 | Valerius et al. | Feb. 4, 1913 |
| 1,208,882 | Young | Dec. 19, 1916 |
| 1,817,329 | Wichman | Aug. 4, 1931 |
| 1,967,469 | Dulany | July 24, 1934 |
| 2,017,456 | Gudmundsen | Oct. 15, 1935 |
| 2,063,778 | Andrus | Dec. 8, 1936 |
| 2,078,682 | Parr et al. | Apr. 27, 1937 |
| 2,110,237 | Parsons | Mar. 8, 1938 |
| 2,117,091 | Gudmundsen | May 10, 1938 |
| 2,167,225 | Van Eweyk | July 25, 1939 |
| 2,220,777 | Othmer | Nov. 5, 1940 |

FOREIGN PATENTS

| Number | Country | Date |
|---|---|---|
| 4,017 | Great Britain | 1873 |
| 16,259 | Great Britain | 1909 |